United States Patent
Al Qizwini et al.

(10) Patent No.: US 11,836,992 B2
(45) Date of Patent: Dec. 5, 2023

(54) IDENTIFICATION AND CLUSTERING OF LANE LINES ON ROADWAYS USING REINFORCEMENT LEARNING

(71) Applicant: General Motors LLC, Detroit, MI (US)

(72) Inventors: Mohammed H. Al Qizwini, Macomb, MI (US); Orhan Bulan, Novi, MI (US); David H. Clifford, Royal Oak, MI (US); Mason D. Gemar, Cedar Park, TX (US)

(73) Assignee: General Motors LLC, Detroit, MI (US)

( * ) Notice: Subject to any disclaimer, the term of this patent is extended or adjusted under 35 U.S.C. 154(b) by 518 days.

(21) Appl. No.: 17/162,548

(22) Filed: Jan. 29, 2021

(65) Prior Publication Data
US 2022/0245386 A1   Aug. 4, 2022

(51) Int. Cl.
| | | |
|---|---|---|
| *G06V 20/56* | (2022.01) | |
| *G06N 3/08* | (2023.01) | |
| *G06V 20/10* | (2022.01) | |
| *G06F 18/214* | (2023.01) | |

(52) U.S. Cl.
CPC .......... *G06V 20/588* (2022.01); *G06F 18/214* (2023.01); *G06N 3/08* (2013.01); *G06V 20/176* (2022.01)

(58) Field of Classification Search
None
See application file for complete search history.

(56) References Cited

U.S. PATENT DOCUMENTS 10,262,214 B1 *   4/2019   Kim .......................... G06T 7/12

* cited by examiner

*Primary Examiner* — Leon Flores
(74) *Attorney, Agent, or Firm* — Harness, Dickey & Pierce, P.L.C.

(57) ABSTRACT

A system comprises a processor and a memory storing instructions. The processor receives an image for processing using a reinforcement learning based agent comprising a neural network trained using a reward function. The image includes N lane lines of a roadway, where N is a positive integer. The instructions configure the processor to traverse the image using the agent at least N times from a first end of the image to a second end of the image by: incrementally moving the agent from a first side of the image to a second side of the image after each traversal; and maximizing rewards for the agent using the reward function during each traversal of the image using the agent. The instructions configure the processor to identify the N lane lines of the roadway as a single cluster of lane lines after traversing the image using the agent at least N times.

20 Claims, 7 Drawing Sheets

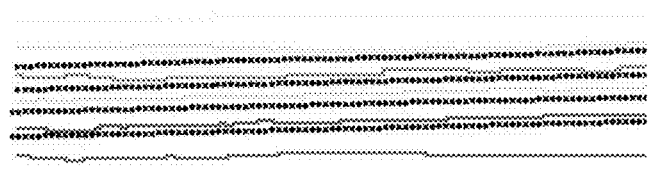
FIG. 8D
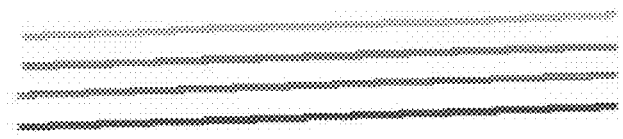
FIG. 8C
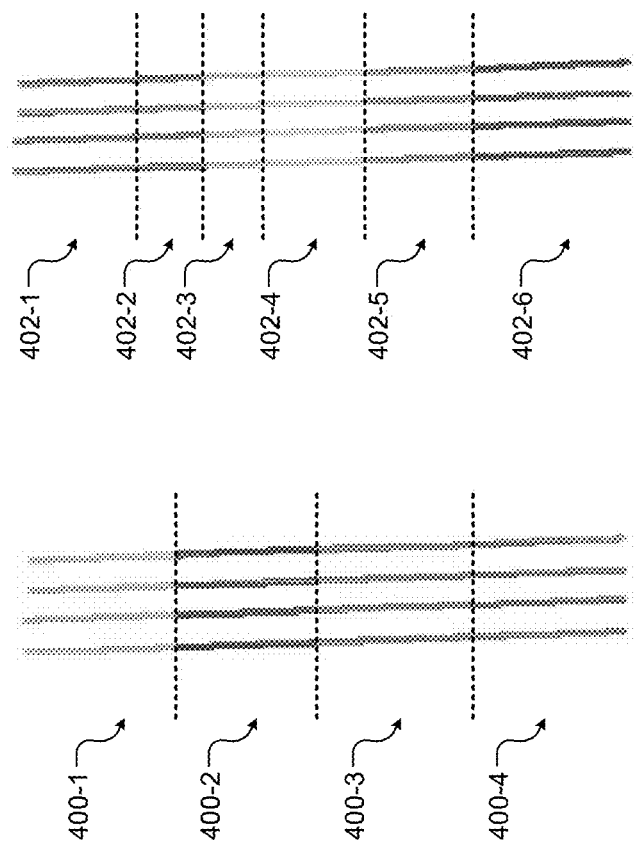
FIG. 8B
FIG. 8A

IDENTIFICATION AND CLUSTERING OF LANE LINES ON ROADWAYS USING REINFORCEMENT LEARNING

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to identification and clustering of lane lines on roadways using reinforcement learning.

Images of roadways can be captured using various techniques. For example, the images can be captured using aerial photography, by driving vehicles equipped with cameras on the roadways, and so on. The images can be processed to extract various features of the roadways from the images. The features can be used for various purposes. For example, the features can be used to construct high-definition maps. In other examples, the features can be used to navigate autonomous and semiautonomous vehicles.

SUMMARY

A system comprises a processor and a memory storing instructions which when executed by the processor configure the processor to receive an image for processing using a reinforcement learning based agent comprising a neural network trained using a reward function. The image includes N lane lines of a roadway, where N is a positive integer. The instructions configure the processor to traverse the image using the agent at least N times from a first end of the image to a second end of the image by: incrementally moving the agent from a first side of the image to a second side of the image after each traversal; and maximizing rewards for the agent using the reward function during each traversal of the image using the agent. The instructions configure the processor to identify the N lane lines of the roadway as a single cluster of lane lines after traversing the image using the agent at least N times.

In another feature, the instructions configure the processor to train the neural network to enable the agent to track a lane line or a gap between adjacent lane lines.

In another feature, the instructions configure the processor to train the neural network to enable the agent to track a center of a lane.

In another feature, the instructions configure the processor to reward the agent during each traversal using the reward function based on at least one of: a position of the agent relative to the second end of the image during the traversal; a composition of pixels around the agent; and a number of times the agent changed course during the traversal.

In another feature, the instructions configure the processor to train the neural network to enable the agent to traverse images using three degrees of freedom.

In another feature, the instructions configure the processor to: train the neural network to enable the agent to track a center of a lane estimated using telemetry data received from at least one of vehicles or satellites; and identify one of the N lane lines associated with the lane regardless of a discontinuity in the one of the N lane lines by tracking the center of the lane and by rewarding the agent based on deviations from the center of the lane.

In another feature, the instructions configure the processor to: estimate a center of each lane in a set of lanes used to train the neural network by using telemetry data received from at least one of vehicles or satellites; and train the neural network to enable the agent to track the center of a respective lane.

In another feature, the instructions configure the processor to: estimate a center of a lane being traversed in the image by using telemetry data received from at least one of vehicles or satellites; traverse the image using the agent by tracking the center of the lane; and identify one of the N lane lines associated with the lane regardless of the one of the N lane lines having a discontinuity by tracking the center of the lane.

In another feature, the instructions configure the processor to reward the agent additionally based on a deviation of the agent from the center of the lane.

In another feature, the instructions configure the processor to sequentially label lanes of the roadway based on the identified N lane lines.

In still other features, a method comprises receiving an image for processing using a reinforcement learning based agent comprising a neural network trained using a reward function. The image includes N lane lines of a roadway, where N is a positive integer. The method comprises traversing the image using the agent at least N times from a first end of the image to a second end of the image by: incrementally moving the agent from a first side of the image to a second side of the image after each traversal; and maximizing rewards for the agent using the reward function during each traversal of the image using the agent. The method comprises identifying the N lane lines of the roadway as a single cluster of lane lines after traversing the image using the agent at least N times.

In another feature, the method further comprises training the neural network to enable the agent to track a lane line or a gap between adjacent lane lines.

In another feature, the method further comprises training the neural network to enable the agent to track a center of a lane.

In another feature, the method further comprises rewarding the agent during each traversal using the reward function based on at least one of: a position of the agent relative to the second end of the image during the traversal; a composition of pixels around the agent; and a number of times the agent changed course during the traversal.

In another feature, the method further comprises training the neural network to enable the agent to traverse images using three degrees of freedom.

In another feature, the method further comprises training the neural network to enable the agent to track a center of a lane by using telemetry data received from at least one of vehicles or satellites; and identifying one of the N lane lines associated with the lane regardless of a discontinuity in the one of the N lane lines by tracking the center of the lane and by rewarding the agent based on deviations from the center of the lane.

In another feature, the method further comprises estimating a center of each lane in a set of lanes used to train the neural network by using telemetry data received from at least one of vehicles or satellites; and training the neural network to enable the agent to track the center of a respective lane.

In another feature, the method further comprises estimating a center of a lane being traversed in the image by using telemetry data received from at least one of vehicles or satellites; traversing the image using the agent by tracking the center of the lane; and identifying one of the N lane lines associated with the lane regardless of the one of the N lane lines having a discontinuity by tracking the center of the lane.

In another feature, the method further comprises rewarding the agent additionally based on a deviation of the agent from the center of the lane.

In another feature, the method further comprises sequentially labeling lanes of the roadway based on the identified N lane lines.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein:

FIGS. 8A-8C show results achieved by processing the image of FIG. 3 using other methods;

FIG. 8D is the same as FIG. 4 and is reproduced for vis-à-vis comparison with FIGS. 8A-8C;

In the drawings, reference numbers may be reused to identify similar and/or identical elements.

DETAILED DESCRIPTION

Figure 1A:
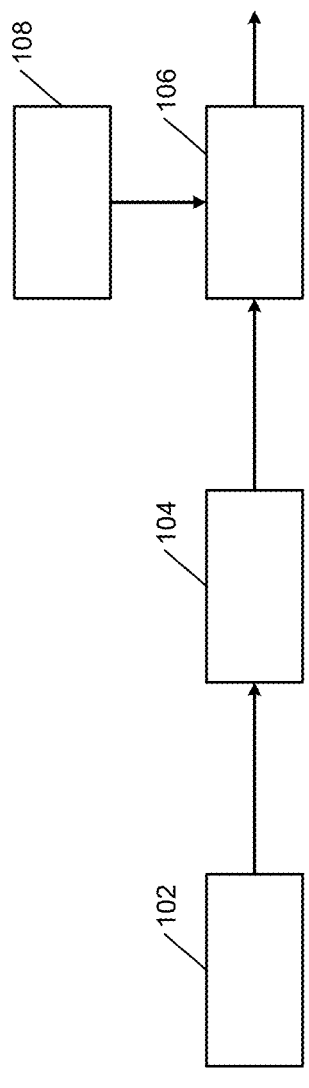
FIGS. 1A and 1B show an example of a system for identifying and clustering lane lines in an image of a roadway using a Reinforcement Learning (RL) based agent of the present disclosure.

The present disclosure provides a reinforcement learning (RL) based agent that is trained to identify and cluster distinct lane lines from an image of a roadway. Typically, the nature of lane lines structure makes it difficult to use classical clustering algorithms. The performance of these algorithms depends on various factors. For example, the performance depends on density and/or shape of clusters, preset thresholds, guessing the number of lanes, and so on. The RL based agent of the present disclosure does not depend on such parameters.

Instead, as explained below in detail, the RL based agent is trained to traverse the image without hitting lane lines. Accordingly, the RL based agent can cluster lane lines regardless of their length, curvature, and occasional discontinuity (e.g., due to lane splitting or merging). The RL based agent provides a scalable solution that does not depend on the length of the segment of the roadway being processed. The RL based agent starts traversing an image at the top of the image and uses only three degrees of movement (i.e., degrees of freedom): down, down-left, and down-right. The relatively small action space enables faster training of the RL based agent relative to the classical clustering algorithms.

Further, as explained below in detail, instead of using human-labeled data for training, the RL based agent is trained using a reward function. The reward function depends on three factors that are monitored as the RL based agent traverses an image: how close the RL based agent is to the end of the image; the color composition of pixels surrounding the RL based agent; and the number of steps (deviations from a relatively straight line path) taken by the RL based agent as opposed to following a relatively straight line.

The speed and accuracy of training the RL based agent can be further improved by using telemetry data (e.g., GPS and other data) collected from vehicles or satellites. For example, the telemetry data can be used to estimate the center of each lane in the training dataset. The RL based agent can be trained to track the estimated center of each lane. Conversely, the RL based agent can be trained to track the lane lines themselves or a gap between adjacent lane lines.

In either case, knowing the center of each lane halves the search space for the RL based agent (i.e., the RL based agent need not navigate the entire width of a lane) during image traversal, which in turn reduces the training time of the RL based agent. Additionally, utilizing the telemetry data can also enable the RL based agent to handle more complex scenarios involving lane splitting/merging and intersecting lines. The other classical algorithms either lack such capability or find it difficult to handle these scenarios as explained below in detail.

A lane detection frameworks typically includes two consecutive pipelines: a lane extraction pipeline followed by a lane clustering pipeline. The RL based agent of the present disclosure operates on an output of the lane extraction pipeline to identify different lane lines. In use, the RL based agent is set at a fixed starting position on one end (e.g., the top left side) of an image. The RL based agent moves from the starting position towards the other end (e.g., bottom) of the image by maximizing collected rewards as explained below in detail. After the RL based agent reaches the other end of the image, the image is split along the path followed by the RL based agent, and the process is repeated from top to bottom of the image until the end of the image (e.g., bottom right side of the image) is reached. All of the image portions are combined with the clustered lane lines, and a lane ID is assigned to each detected lane (e.g., from left to right of the image in the above example). These and other features of the present disclosure are now explained in detail.

Figure 4:
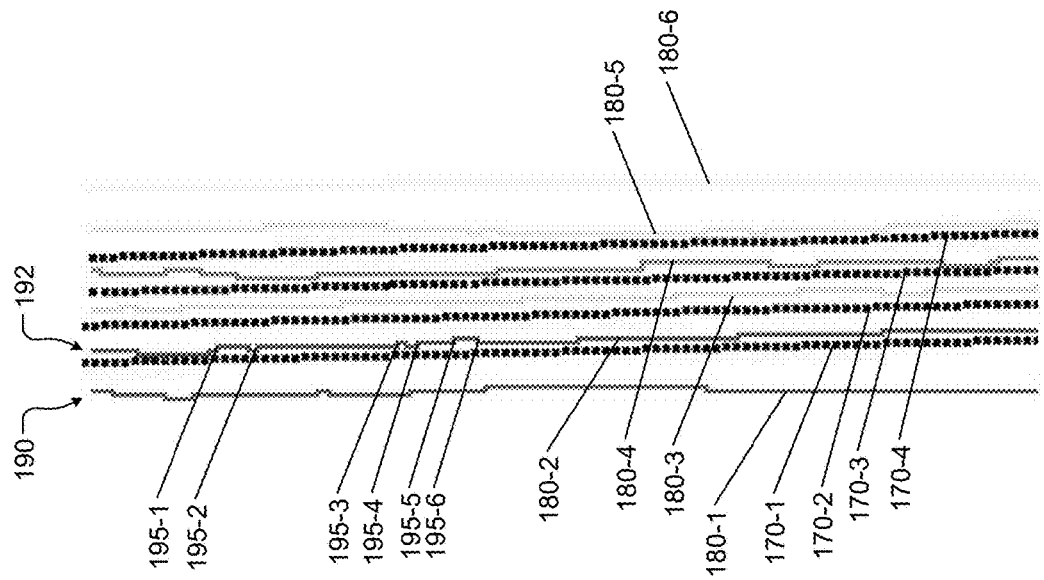
FIG. 4 shows a plurality of paths traversed by the RL based agent in the image of FIG. 3 to identify and cluster lane lines in the image of FIG. 3.
Figure 3:
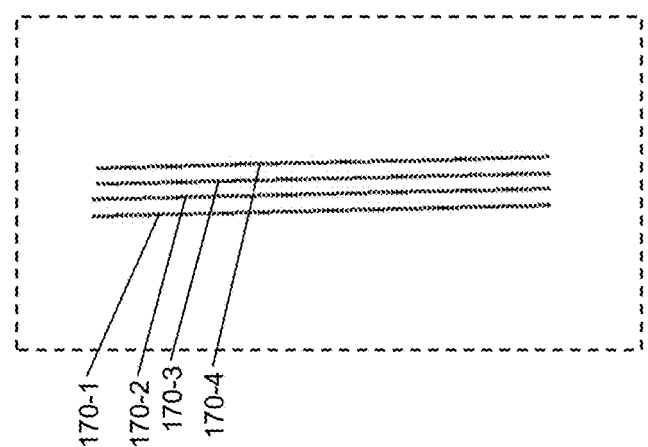
FIG. 3 shows an example of an image including raw data about lanes on a roadway that can be processed by the RL based agent of the present disclosure.

The present disclosure is organized as follows. Examples of a system and an overall method for identifying and clustering lane lines in an image of a roadway using the RL based agent of the present disclosure are shown and described with reference to FIGS. 1A, 1B, and 2. A method for identifying and clustering lane lines using the RL based agent is shown and described with reference to FIGS. 3-5. FIG. 3 shows an example of an image including raw data about lanes on a roadway, and FIG. 4 shows a plurality of paths traversed by the RL based agent in the image of FIG. 3 to identify and cluster lane lines in the image of FIG. 3.

Thereafter, a method for training the RL based agent is shown and described with reference to FIGS. 3, 4, and 6. Examples of rewarding/punishing the RL based agent during training and in use are shown and described with reference to FIGS. 7A and 7B. Examples of results achieved by processing the image of FIG. 3 using other classical algorithms are shown and described with reference to FIGS. 8A-8C. The results achieved by these other methods are compared with the results achieved by the RL based agent shown in FIG. 8D. Subsequently, an example of a lane line that is temporarily discontinuous is shown in FIG. 9A, and how the RL based agent correctly identifies and clusters lane lines in FIG. 9A while other methods fail is shown and described with reference to FIG. 9B.

Figure 1B:
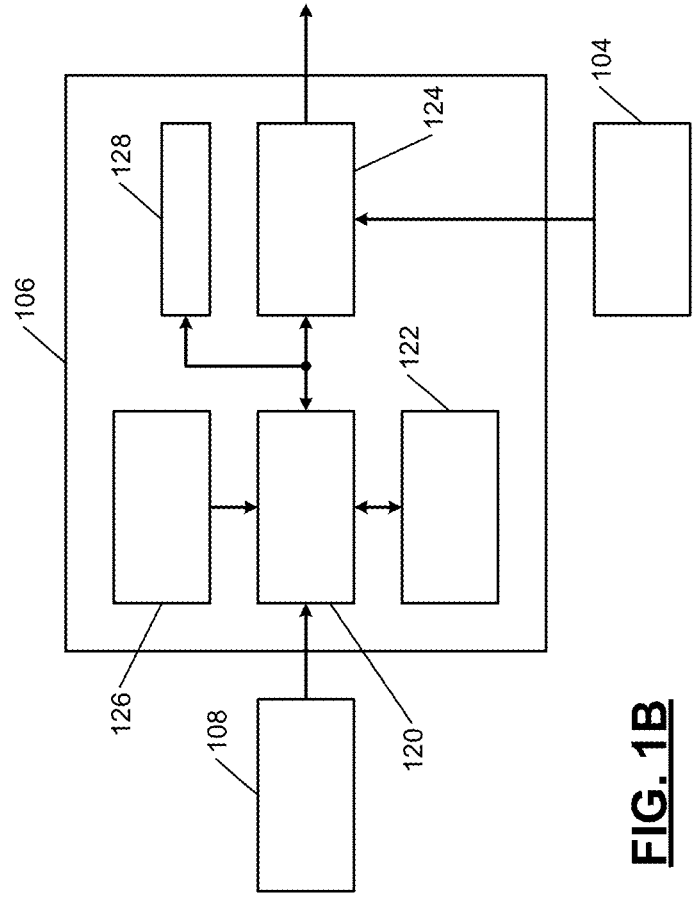

FIGS. 1A and 1B show an example of a system 100 that can identify and cluster lane lines in an image of a roadway using the RL based agent of the present disclosure. In FIG. 1A, the system 100 comprises an image capturing system 102, an image processing system 104, a lane clustering system 106, and a telemetry system 108. The image capturing system 102, the image processing system 104, and optionally the telemetry system 108 provide inputs to the lane clustering system 106. FIG. 1B shows the lane clustering system 106 in further detail.

In FIG. 1A, the image capturing system 102 can capture images of roadways using, for example, aerial photography, by driving vehicles equipped with cameras on the roadways, and so on. The image processing system 104 processes the images captured by the image capturing system 102. The image processing system 104 can extract various features of the roadways from the images. For example, the features can include raw data about lane lines and corresponding lanes on the roadways. In other words, the image processing system 104 performs lane detection. An example of an image including the raw data about lanes on a roadway is shown in FIG. 3. The image processing system 104 supplies images including the raw data about lanes on the roadways to the lane clustering system 106.

In FIG. 1B, the lane clustering system 106 comprises a processor 120, a memory 122, and an RL based agent (hereinafter the agent) 124. For example, the agent 124 can comprise a neural network having adjustable weights 128 as described below in detail. The processor 120 performs the methods described below to train the agent 124 using a reward function 126 and by adjusting the weights 128 of the neural network as described below in detail.

Subsequently, the processor 120 uses the trained agent 124 and performs the methods described below to identify and cluster lane lines in the images received from the image processing system 104 as described below in detail. During use, the trained agent 124 uses the reward function 126 to maximize the rewards (without adjusting the weights 128 set during training) while traversing images. Optionally, the processor 120 can also utilize the telemetry data from the telemetry system 108 during training as well as during subsequent use of the agent 124 as described below in detail.

Figure 2:
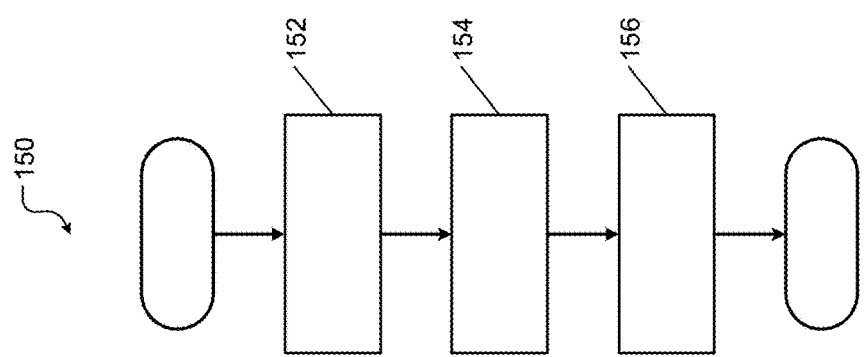
FIG. 2 shows an overall method for identifying and clustering lane lines using the RL based agent of the present disclosure.

FIG. 2 shows an overall method 150 performed by the lane clustering system 106 for identifying and clustering lane lines using the agent 124 of the present disclosure. The method 150 is described in further detail with reference to subsequent figures. Throughout the following description of the method 150 and the methods that follow, the term control refers to the processor 120 of the lane clustering system 106.

At 152, control trains the agent 124. That is, control trains the neural network to enable the agent 124 to perform the methods for detecting and clustering the lane lines as described below in detail. The training method is described in further detail with reference to FIGS. 6-7B. At 154, control receives an image of a roadway (e.g., an image shown in FIG. 3) from the image processing system 104. At 156, control uses the trained agent 124 to identify and cluster lane lines in the image. The methods used to identify and cluster lane lines in the image are described below in further detail with reference to FIGS. 4-6.

FIG. 3 shows an example of an image of a roadway provided by the image processing system 104 to the lane clustering system 106. The image includes a plurality of lane lines 170-1, 170-2, 170-3, and 170-4 (collectively lane lines 170). For example only, only four lane lines 170 are used throughout the present disclosure for illustrative purposes. In general, the images provided by the image processing system 104 to the lane clustering system 106 can include N lane lines and (N+1) lanes, where N is a positive integer.

FIG. 4 shows the lane lines 170 shown in FIG. 3 and shows a plurality of paths traversed by the agent 124 along the lane lines 170. The paths traversed by the agent 124 are shown as 180-1, 180-2, 180-3, 180-4, 180-5, and 180-6 (collectively the paths 180). By traversing the paths 180 as shown, the agent 124 can identify and cluster the lane lines 170 shown in the image of FIG. 3. For example, as explained below in detail, to identify N lane lines in an image, the agent 124 may traverse the image N+2 times (i.e., via N+2 paths). In general, to identify N lane lines in an image, the agent 124 may traverse the image at least (i.e., more than) N times (i.e., via at least or more than N paths). FIG. 4 is referenced throughout the following detailed description of the methods. Other elements identified in FIG. 4 are explained in the following description of these methods.

Figure 5:
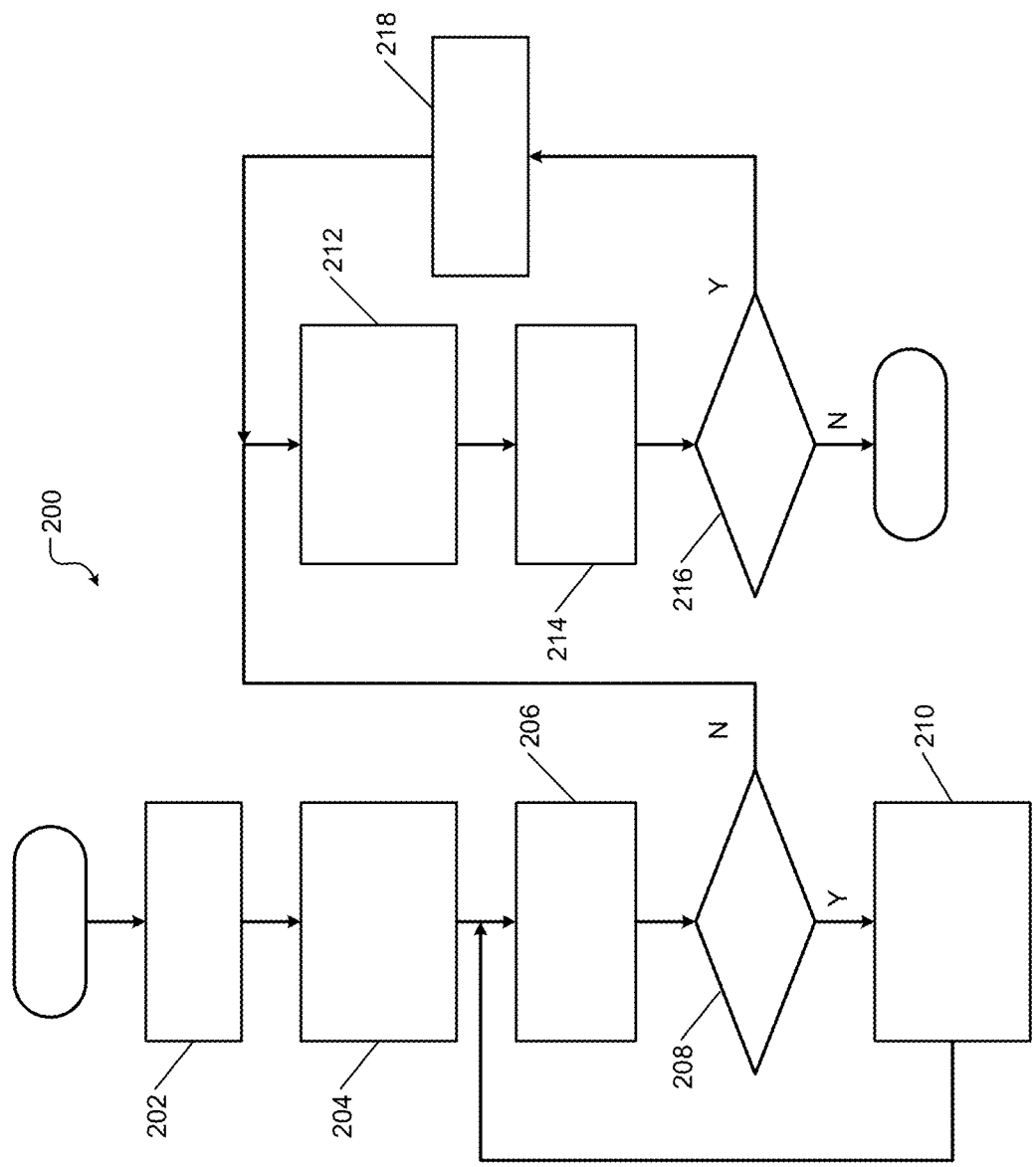
FIG. 5 shows a method for identifying and clustering lane lines using the RL based agent of the present disclosure.

FIG. 5 shows a method 200 for identifying and clustering lane lines using the agent of the present disclosure. The method 200 shows step 156 of the method 150 in greater detail. At 202, control receives an image of a roadway (e.g., the image shown in FIG. 3) from the image processing system 104. At 204, control selects a starting position for the trained agent 124 from where to begin traversing the image. For example, control may select the starting position somewhere in the top left portion of the image (e.g., at 190). Alternatively, while not shown, control may select the starting position somewhere in the top right portion of the image.

At 206, the trained agent 124 traverses (or navigates) the image from top to bottom. During the navigation, the trained agent 124 follows a path (e.g., path 180-1) that maximizes rewards (explained below in detail in the description of training of the agent 124 with reference to FIG. 6). At 208, control determines if the trained agent 124 detected a lane line. If the trained agent 124 detected a lane line in the first traversal of the image, the starting position may be incorrect. For example, the starting position may be in the middle of the image, and there may be one or more lane lines to the left of the starting position in the image that may be missed (i.e., may remain undetected). Accordingly, if the trained agent 124 detected a lane line in the first traversal of the image, at 210, the trained agent 124 returns to the top of the image, and control selects a new starting position that is farther to the left than the previously selected starting position, and control returns to 206. (In the alternative example, where the starting position is selected somewhere in the top right portion of the image, and the image is traversed from right to left, control will move farther to the right.)

If the trained agent 124 did not detect a lane line in the first traversal of the image, at 212, the trained agent 124 returns to the top of the image, and control selects a next starting position to the right of the previously selected starting position. (In the alternative example, control will select a next starting position to the left of the previously selected starting position.) The next starting position is shown at 192 in FIG. 4. At 214, the trained agent 124 traverses the image from top to bottom from the next starting position.

During the navigation, the trained agent 124 follows a path (e.g., path 180-2) that maximizes rewards. At 216, control determines if the trained agent 124 detected a lane line between two adjacent paths traversed by the trained agent 124 (e.g., paths 180-1 and 180-2). If the trained agent 124 detected a lane line in the next traversal of the image, at 218, control assigns an identifier to the detected lane line (e.g., lane line 170-1 is designated or labeled as Lane line 1), and control returns to 212. If the trained agent 124 did not detect a lane line at 216 (e.g., in the instance when the trained agent 124 traversed path 180-6), control determines that all of the lane lines in the image are identified, and control ends.

At this point, control can sequentially label the lanes of the roadway in the image based on the identified lane lines 1 to N from left to right. For example, lane between lanes lines 1 and 2 can be labeled as lane 1, lane between lanes lines 2 and 3 can be labeled as lane 2, and so on. In the alternative example, control can similarly label the lanes based on the identified lane lines 1 to N from right to left.

Figure 6:
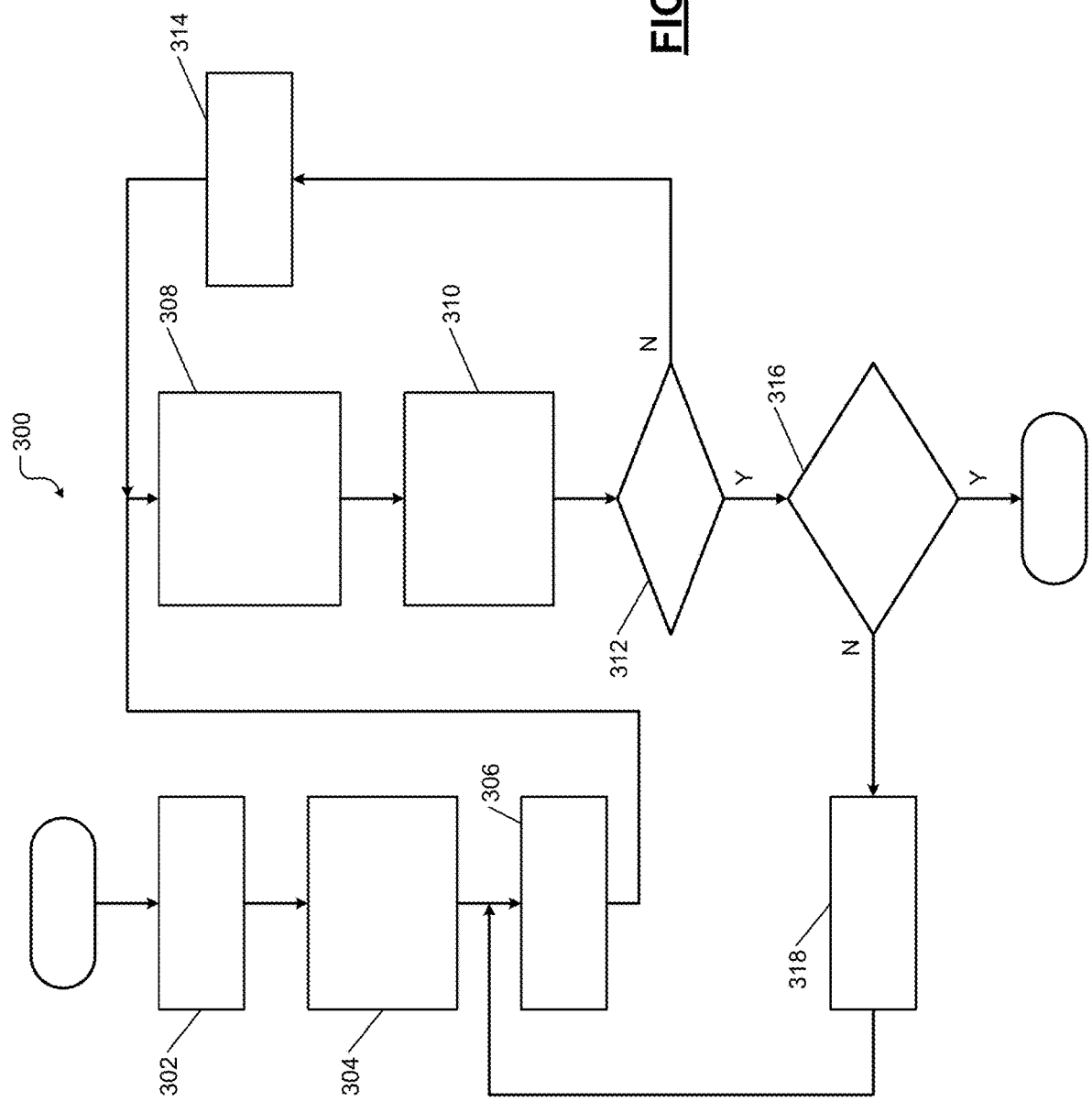
FIG. 6 shows a method for training the RL based agent to identify and cluster lane lines in an image of a roadway according to the present disclosure.

FIG. 6 shows a method 300 for training the agent 124 (i.e., for training the neural network to enable the agent 124 to perform lane detection and clustering described above). At 302, control receives an image of a roadway (e.g., the image shown in FIG. 3) from the image processing system 104. At 304, control selects a starting position for the agent 124 from where to begin traversing the image. At 306, the agent 124 begins traversing the image from the starting position.

At 308, control uses the reward function 126 to reward or punish the agent 124. The reward function 126 is based on multiple factors. For example, the factors include the distance of the agent 124 from the end of the image, the color composition of pixels in a window around the agent 124, and the number of steps taken by the agent 124. The steps taken by the agent 124 are deviations of the agent 124 to the left and right of a relatively straight line path as the agent 124 traverses the image along the path. Examples of some of the steps taken by the agent 124 along the path 180-2 are shown in FIG. 4 at 195-1, 195-2, 195-3, 195-4, 195-5, and 195-6 (collectively the steps 195).

The reward function 126 is described below in further detail with reference to FIGS. 7A and 7B. At 310, control adjusts weight assignments of the agent 124 (i.e., weights of the neural network) based on the rewards/punishments accorded to the agent 124 as the agent traverses the image. Note that during actual use (e.g., in the method 200 of FIG. 5), while the trained agent 124 uses the reward function 126 to maximize the rewards during image traversal, the weights 128 remain unchanged. Except for the adjustment of the weights 128, which is performed only during training of the agent 124, the use of the reward function is similar during training and in actual use of the agent 124.

At 312, control determines if the agent 124 has reached end of the image. If the agent 124 has not yet reached the end of the image, control continues to traverse the image at 314, and control returns to 308. If the agent 124 has reached the end of the image, at 316, control determines if the agent 124 correctly tracked a lane line (or center of lane or a gap between adjacent lane lines) based on the rewards/punishments accumulated by the agent during the traversal. If the agent 124 did not correctly track the lane line (or center of lane or a gap between adjacent lane lines), at 318, the agent 124 returns to the starting position, and control returns to 306 to reiterate the traversal. Control ends if the agent 124 correctly tracked the lane line (or center of lane or a gap between adjacent lane lines), at which point the agent 124 is trained and is ready for use.

The accuracy and speed with which the agent 124 can be trained to track a lane line can be increased by additionally using the telemetry data. For example, a center of each lane in a training dataset of lanes (e.g., the image shown in FIG. 3) can be estimated using the telemetry data. For example, the telemetry data can include GPS data and other data received from vehicles and/or satellites. The agent 124 can then be trained to track the estimated center of a respective lane while traversing the image to identify a lane line associated with the respective lane. Knowing the center of the lane reduces (halves) the search space for the agent 124 from a lane width to half of the lane width (i.e., to an area between the center of a lane and an associated lane line). Reducing the search space for the agent 124 also reduces the search time for the agent 124 (i.e., the time taken by the agent 124 to navigate the image). Accordingly, the training of the agent 124 can be significantly improved in terms of the accuracy and speed with which the agent 124 can identify lane lines.

Figure 7B:
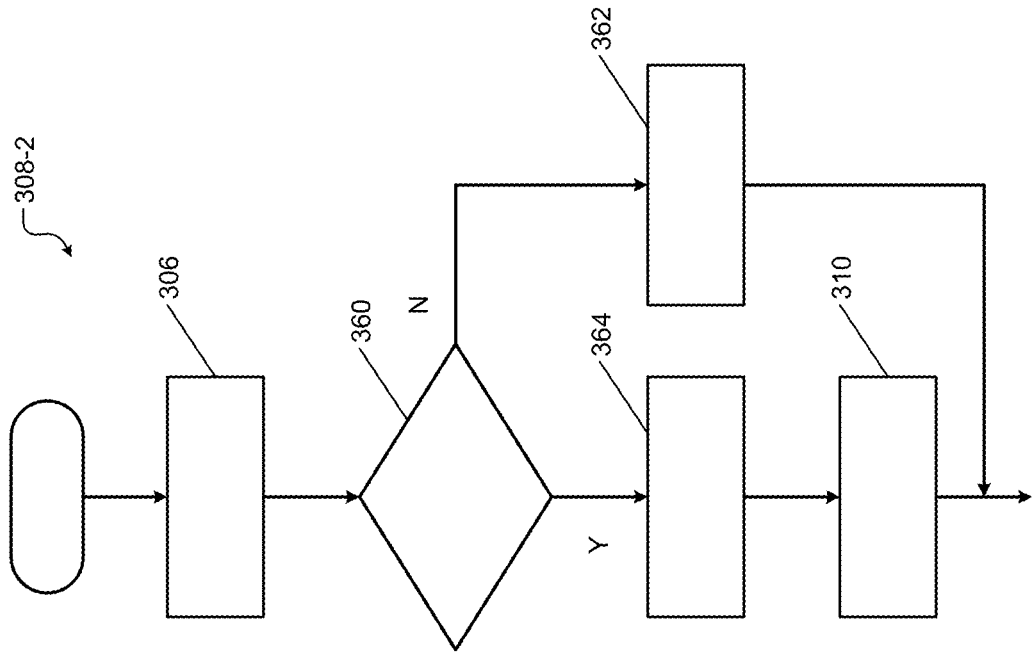
FIGS. 7A and 7B show examples of rewarding/punishing the RL based agent during training and in use.
Figure 7A:
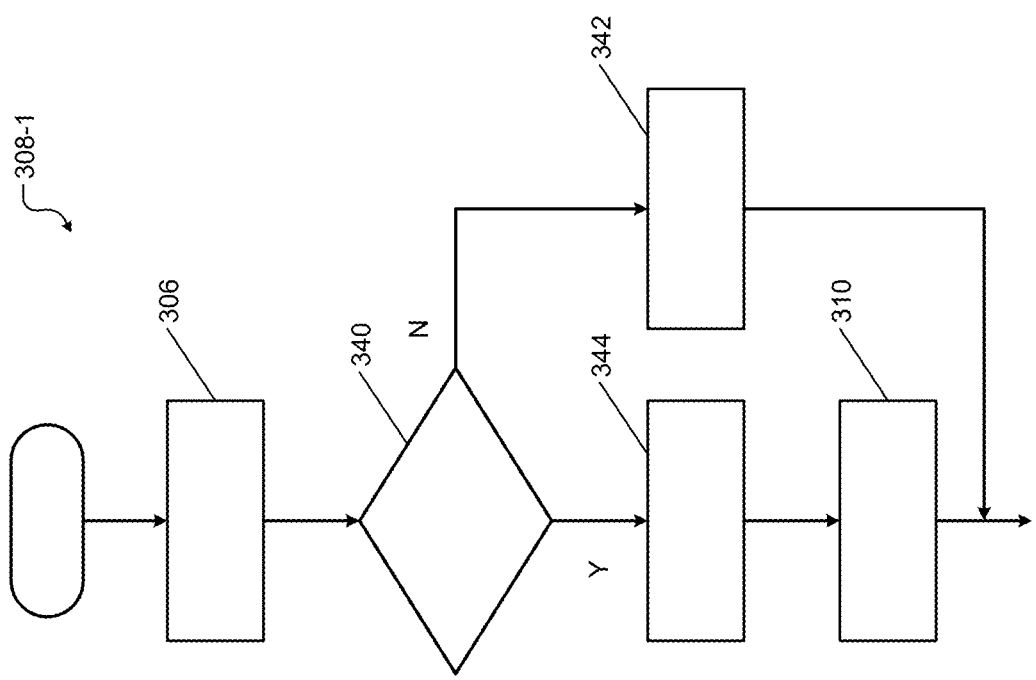

FIG. 7A shows an example of rewarding/punishing the agent 124 during training (as well as in use, where the only difference is that unlike during training, the weights 128 are not adjusted). FIG. 7A shows an example of step 308 (shown as 308-1) of the method 300. Steps 306 and 310 are the same as in the method 300 and are therefore not described again for brevity. In the example 308-1, the step 308 in the method 300 includes steps 340, 342, and 344.

After step 306, at 340, as the agent 124 traverses the image along a path, control determines if the agent 124 is hitting a lane line (or the center of the lane). For example, control determines if the agent 124 is hitting a lane line based on the number of black and white pixels in the vicinity of the agent 124 (e.g., within a window around the agent 124). The number of black pixels in the window denote proximity of the agent 124 to a lane line. The number of white pixels in the window denote the lane itself (i.e., area between two lane lines). Depending on the composition of the black and white pixels in the window, control determines if the agent 124 is hitting the lane line. To maximize rewards while traversing an image along a path during actual use, control trains the agent 124 to stay away from (i.e., not contact) the lane line (or the center of the lane).

At 342, control rewards the agent 124 if the agent 124 is not hitting the lane, and control proceeds to step 312 of the method 300 without adjusting the weights of the neural network. Conversely, if the agent 124 is hitting the lane, at 344, control punishes the agent 124, adjusts the weights of the neural network at 310, and proceeds to step 312 of the method 300.

FIG. 7B shows an example of rewarding/punishing the agent 124 during training (as well as in use, where the only difference is that unlike during training, the weights 128 are not adjusted). FIG. 7B shows another example of step 308 (shown as 308-2) of the method 300. Steps 306 and 310 are the same as in the method 300 and are therefore not described again for brevity. In the example 308-2, the step 308 in the method 300 includes steps 360, 362, and 364. Both the examples 308-1 and 308-2 can be performed in the step 308 of the method 300.

After step 306, at 360, as the agent 124 traverses the image along a path, control determines the number of steps 195 taken by the agent 124 along a path. At 362, control rewards the agent 124 if the number of steps taken by the agent 124 is not increasing as the agent 124 traverses the image along the path, and control proceeds to step 312 of the method 300 without adjusting the weights of the neural network. Conversely, if the number of steps taken by the agent 124 is increasing as the agent 124 traverses the image along the path, at 364, control punishes the agent 124, adjusts the weights of the neural network at 310, and proceeds to step 312 of the method 300. To maximize rewards while traversing an image along a path during actual use, control trains the agent 124 to minimize the number of steps 195.

FIGS. 8A-8C show results achieved using other methods. FIG. 8D is the same as FIG. 4 and is reproduced for vis-a-vis comparison with the results achieved by the other methods. For example, FIG. 8A shows results obtained by using a k-means clustering algorithm. For example, when the image shown in FIG. 3 is processed using the k-means clustering algorithm, the result includes four distinct clusters of lane lines identified at 400-1, 400-2, 400-3, and 400-4. In another example, FIG. 8B shows results obtained by using a mean-shift clustering algorithm. For example, when the image shown in FIG. 3 is processed using the mean-shift clustering algorithm, the result includes six distinct clusters of lane lines identified at 402-1, 402-2, 402-3, 402-4, 402-5, and 402-6. However, the image shown in FIG. 3 in fact includes only a single cluster of lane lines. In contrast to the k-means and mean-shift clustering algorithms, the trained agent 124 according to the present disclosure correctly detects a single cluster of lane lines in the image of FIG. 3.

In yet another example, FIG. 8C shows results obtained by using a dbscan clustering algorithm. While the dbscan clustering algorithm detects a single cluster of lane lines in the image of FIG. 3, the dbscan clustering algorithm fails when a lane splits or merges (i.e., when a lane line is discontinuous) as explained below in detail.

FIG. 9A shows an example where a lane line 404-1 becomes temporarily discontinuous at 405 and then continues at 404-2. For example, a lane line can become discontinuous due to a natural break cause by a split or merge situation or an unnatural break that is a byproduct of a limitation in a lane line inference model that is used to pre-process an image to create an image like that shown as FIG. 3. Accordingly, the lane lines 404-1 and 404-2 belong to (i.e., are sections of) the same lane line (e.g., the lane line 170-1 shown in FIG. 4) despite the temporary discontinuity at 405. However, when the image shown in FIG. 9A is processed using the dbscan clustering algorithm, the result includes two distinct clusters 406, 408 of lane lines.

Figure 9B:
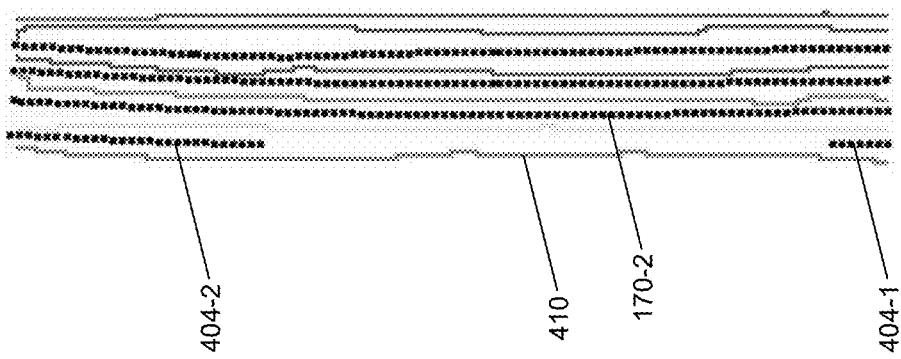
FIG. 9B shows how the RL based agent of the present disclosure correctly identifies and clusters lane lines in FIG. 9A although a lane line is temporarily discontinuous in FIG. 9A.
Figure 9A:
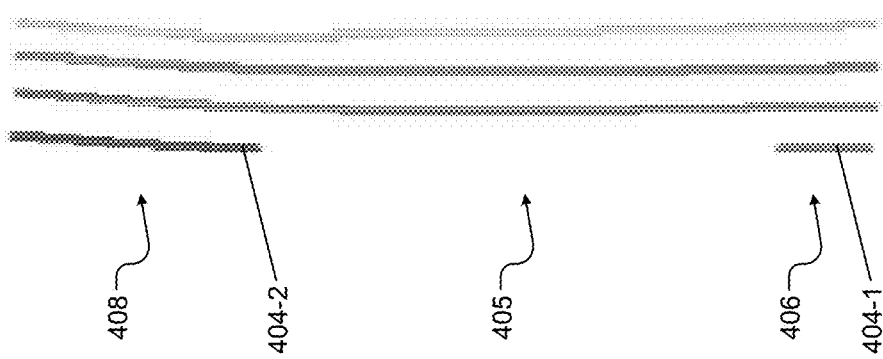
FIG. 9A shows an example of a lane line that is temporarily discontinuous.

In contrast, as shown in FIG. 9B, the trained agent 124 according to the present disclosure correctly detects a single cluster of lane lines in the image of FIG. 9A. During the discontinuous portion 405 of the lane line including the sections 404-1 and 404-2 of the lane line, the agent 124 is trained to track the center of the lane formed by the lane line 170-2 and the lane lines 404-1 and 404-2. During the discontinuous portion 405, any deviation of the agent 124 from the center of the lane formed by the lane line 170-2 and the lane lines 404-1 and 404-2 is combined with the reward function. The agent 124 is rewarded if the deviation is relatively steady (i.e., relatively unchanged) during the discontinuous portion 405. The agent 124 is penalized if the deviation varies relative to what the deviation is when the agent 124 tracks the lane lines 404-1 and 404-2. The accuracy with which the trained agent 124 can track the center of the lane can be increased by additionally using the telemetry data as explained above with reference to FIG. 6.

Accordingly, as shown in FIG. 9B, the trained agent 124 is able to traverse the image of 9A along a path 410 and is able to correctly detect the lane lines 404-1 and 404-2 as belonging to the same lane line (e.g., the lane line 170-1). Therefore, contrary to the dbscan and other classical clustering algorithms, the trained agent 124 of the present disclosure is able to correctly identify all of the lane lines in the image shown in FIG. 9A as a single cluster of lane lines. Thus, the trained agent 124 of the present disclosure not only provides the many benefits described above bus also solves the many problems identified above with the other clustering algorithms and significantly improves the technical field of identifying and clustering lane lines of roadways.

The foregoing description is merely illustrative in nature and is not intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A system comprising:
   a processor; and
   a memory storing instructions which when executed by the processor configure the processor to:
   receive an image for processing using a reinforcement learning based agent comprising a neural network trained using a reward function, the image including N lane lines of a roadway, where N is a positive integer;
   traverse the image using the agent at least N times from a first end of the image to a second end of the image by:
   incrementally moving the agent from a first side of the image to a second side of the image after each traversal; and
   maximizing rewards for the agent using the reward function during each traversal of the image using the agent; and
   identify the N lane lines of the roadway as a single cluster of lane lines after traversing the image using the agent at least N times.

2. The system of claim 1 wherein the instructions configure the processor to train the neural network to enable the agent to track a lane line or a gap between adjacent lane lines.

3. The system of claim 1 wherein the instructions configure the processor to train the neural network to enable the agent to track a center of a lane.

4. The system of claim 1 wherein the instructions configure the processor to reward the agent during each traversal using the reward function based on at least one of:
   a position of the agent relative to the second end of the image during the traversal;
   a composition of pixels around the agent; and
   a number of times the agent changed course during the traversal.

5. The system of claim 1 wherein the instructions configure the processor to train the neural network to enable the agent to traverse images using three degrees of freedom.

6. The system of claim 1 wherein the instructions configure the processor to:
train the neural network to enable the agent to track a center of a lane estimated using telemetry data received from at least one of vehicles or satellites; and
identify one of the N lane lines associated with the lane regardless of a discontinuity in the one of the N lane lines by tracking the center of the lane and by rewarding the agent based on deviations from the center of the lane.

7. The system of claim 1 wherein the instructions configure the processor to:
estimate a center of each lane in a set of lanes used to train the neural network by using telemetry data received from at least one of vehicles or satellites; and
train the neural network to enable the agent to track the center of a respective lane.

8. The system of claim 1 wherein the instructions configure the processor to:
estimate a center of a lane being traversed in the image by using telemetry data received from at least one of vehicles or satellites;
traverse the image using the agent by tracking the center of the lane; and
identify one of the N lane lines associated with the lane regardless of the one of the N lane lines having a discontinuity by tracking the center of the lane.

9. The system of claim of claim 8 wherein the instructions configure the processor to reward the agent additionally based on a deviation of the agent from the center of the lane.

10. The system of claim 1 wherein the instructions configure the processor to sequentially label lanes of the roadway based on the identified N lane lines.

11. A method comprising:
receiving an image for processing using a reinforcement learning based agent comprising a neural network trained using a reward function, the image including N lane lines of a roadway, where N is a positive integer;
traversing the image using the agent at least N times from a first end of the image to a second end of the image by:
incrementally moving the agent from a first side of the image to a second side of the image after each traversal; and
maximizing rewards for the agent using the reward function during each traversal of the image using the agent; and
identifying the N lane lines of the roadway as a single cluster of lane lines after traversing the image using the agent at least N times.

12. The method of claim 11 further comprising training the neural network to enable the agent to track a lane line or a gap between adjacent lane lines.

13. The method of claim 11 further comprising training the neural network to enable the agent to track a center of a lane.

14. The method of claim 11 further comprising rewarding the agent during each traversal using the reward function based on at least one of:
a position of the agent relative to the second end of the image during the traversal;
a composition of pixels around the agent; and
a number of times the agent changed course during the traversal.

15. The method of claim 11 further comprising training the neural network to enable the agent to traverse images using three degrees of freedom.

16. The method of claim 11 further comprising:
training the neural network to enable the agent to track a center of a lane by using telemetry data received from at least one of vehicles or satellites; and
identifying one of the N lane lines associated with the lane regardless of a discontinuity in the one of the N lane lines by tracking the center of the lane and by rewarding the agent based on deviations from the center of the lane.

17. The method of claim 11 further comprising:
estimating a center of each lane in a set of lanes used to train the neural network by using telemetry data received from at least one of vehicles or satellites; and
training the neural network to enable the agent to track the center of a respective lane.

18. The method of claim 11 further comprising:
estimating a center of a lane being traversed in the image by using telemetry data received from at least one of vehicles or satellites;
traversing the image using the agent by tracking the center of the lane; and
identifying one of the N lane lines associated with the lane regardless of the one of the N lane lines having a discontinuity by tracking the center of the lane.

19. The method of claim 18 further comprising rewarding the agent additionally based on a deviation of the agent from the center of the lane.

20. The method of claim 11 further comprising sequentially labeling lanes of the roadway based on the identified N lane lines.

* * * * *